Nov. 11, 1941.　　A. D. DIRCKSEN　　2,261,978
ILLUMINATED SIGHT
Filed May 8, 1940　　2 Sheets-Sheet 1
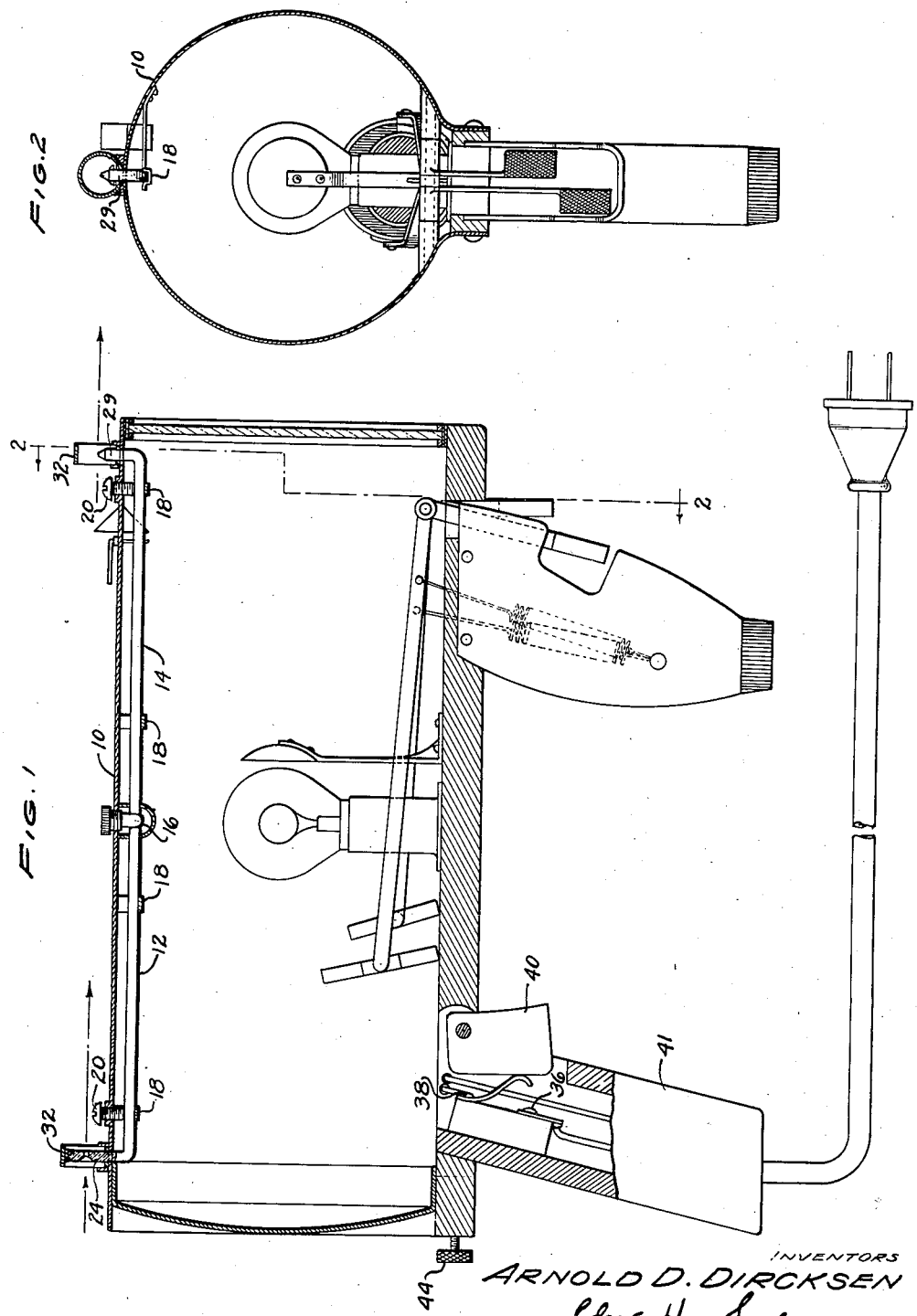
INVENTORS
ARNOLD D. DIRCKSEN
BY
ATTORNEYS Nov. 11, 1941.   A. D. DIRCKSEN   2,261,978
ILLUMINATED SIGHT
Filed May 8, 1940   2 Sheets-Sheet 2
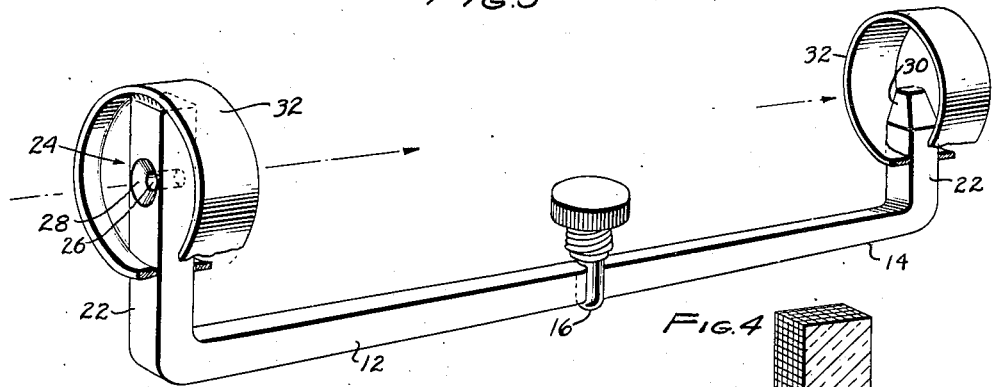
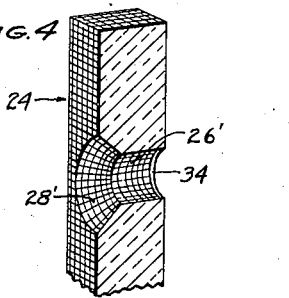
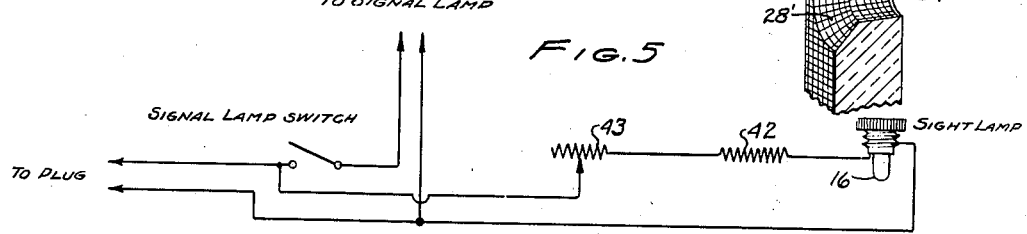
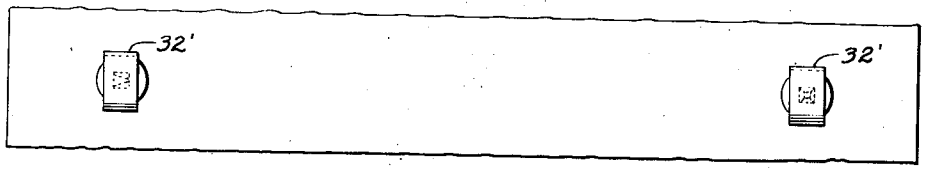
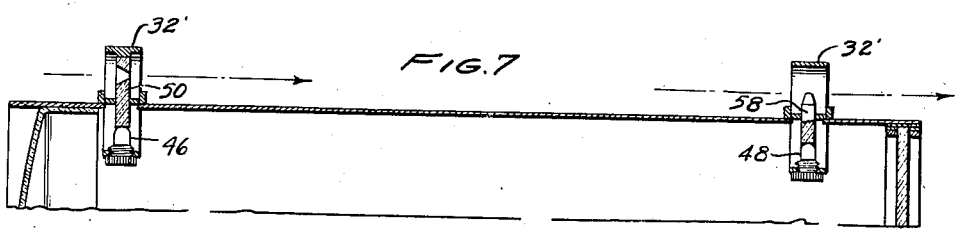
INVENTOR
ARNOLD D. DIRCKSEN
BY
ATTORNEYS Patented Nov. 11, 1941

2,261,978

UNITED STATES PATENT OFFICE 2,261,978

ILLUMINATED SIGHT

Arnold D. Dircksen, Dayton, Ohio

Application May 8, 1940, Serial No. 334,001

3 Claims. (Cl. 33—46)

(Granted under the act of March 3, 1883, as amended April 30, 1928; 370 O. G. 757)

The invention described herein may be manufactured and used by or for the Government for governmental purposes, without the payment to me of any royalty thereon.

My invention relates to illuminated sighting devices and is shown as particularly adapted for use in a signaling device employing light for the transmission of messages such as is shown in Patent No. 2,085,020 granted to W. T. Harding, June 29, 1939, or in Patent No. 2,017,849 granted to H. H. Blee et al., October 22, 1935.

The primary object of my invention is to utilize a novel arrangement of sight illumination to produce an effective and efficient sighting system.

Another object of my invention is to provide a sighting means for a signal lamp which will be both accurate for night use and efficient for use in the daytime.

Further objects and advantages will become readily apparent in the following description and the accompanying drawings in which:

Figure 1 is a longitudinal cross-sectioned assembly of my novel lamp with certain elements shown in full;

Figure 2 is a transverse section of my lamp taken on the line 2—2 of Figure 1;

Figure 3 is a detailed assembly of the sight shown in Figure 1;

Figure 4 is an enlarged sectional fragmentary view of the front eyepiece shown in Figure 3;

Figure 5 is a diagram of the circuit used in the lamp;

Figure 6 is a fragmentary top plan view of a modification of my invention; and

Figure 7 is a cross-sectioned view taken on line 7—7 of Figure 6.

My invention is illustrated in Figures 1 and 2 as adapted for use in a signal lamp of a type and for a purpose similar to that shown in the above said patents.

Referring to the drawings, there is shown mounted on the lamp housing 10 my novel illuminated sight assembly which is shown separately in Figure 3. The sight comprises two rods 12 and 14 of transparent material such as "Lucite," "Plexiglas," quartz or the like having the property of internally transmitting light from one end thereof to the other end with a high degree of efficiency. A light bulb 16, with suitable electrical contact socket, is positioned so that the light emanating therefrom will enter the central or inner ends of the rods 12 and 14 simultaneously. There is provided for each rod a pair of spring holders 18 for holding the rods in a substantially fixed position within the housing 10.

These springs 18 support the rods by a continuous upward pressure. The outer springs have an adjustment screw 20 for use in positioning the sight-piece end of each rod into alignment for adjustment of the lamp sights.

The outward ends 22 of each rod are upturned to provide the front and rear sight-pieces for the lamp in the manner of a standard sight. The rear sight 24 is in the form of an aperture 26 with a countersunk portion 28, and the front sight 29 is formed with a truncated end portion 30. Each sight-piece is further provided with an enclosing ring 32 for shielding the sight-piece. These rings 32 are mounted on the housing 10 and have an aperture in the bottom for receiving the sight-piece in loose fitting relation to permit adjustment of same by the screws 20. These rings 32 are coated on their interior sides with a black material, such as paint, having a low value of light reflection in order to prevent any blurring of the sight-pieces when illuminated.

Preferably, that portion of the rear sight-piece enclosed in the ring 32 is entirely coated with an opaque covering such as optical black paint except for the aperture 26 and the countersunk portion 28. In this manner, light is permitted to emanate from only the aperture portion of the sight-piece thus controlling the illumination of the sight.

Still further control of illumination of the sight is obtained by coating the surface of the countersunk portions 28' and the interior of the aperture 26' with an opaque covering, except for a narrow ring 34 at the front of the aperture, as shown in Figure 4. This has the effect of reducing undesirable illumination of the rear sight yet providing a ring of sufficient light to make it clearly visible.

Figure 5 shows a conventional wiring diagram for the signaling device. The signal lamp switch represents the switch contacts 36 and 38, and trigger 40 incorporated in the rear handle 41 of Figure 1. Connected to the current source in parallel with the signal lamp is a circuit to the sight lamp having a fixed resistance 42 for reducing the voltage to the proper amount for the sight lamp bulb 16. A variable resistance 43 is connected in series with the fixed resistance to control the intensity of the sight lamp 16 and is controlled by a screw 44 mounted adjacent the rear handle and operates both as a switch and resistance control.

It will be seen from the above description that my novel sight is so designed as to permit of daytime use with or without illumination of the small bulb 16 and, since the rear sight is blackened, will be more efficient than the usual sight. For night operation, the small bulb 16 is turned on by the resistance control switch 44. Light is transmitted through the light-transmitting rods 12 and 14 and into the sight-piece ends thereof to locate the rear sight for the operator and to clearly outline the front sight. Normally it is often difficult for an operator or user of any sighting device to find the rear sight in the dark, but it is readily apparent in my novel sight that, because of the limited amount of light delivered at the rear sight, location of the sight is accomplished readily and without any limitation upon the sighting operation, which would not be avoided were a larger amount of light emitted at this point.

Figures 6 and 7 show a modification of my invention in which lights 46 and 48 are individually mounted for each sight. Positioned immediately above the respective light bulbs are substantially short sight-pieces 50 and 58 of similar material and shape as the sights 24 and 30, described in the first embodiment of the invention. It will also be seen in Figures 5 and 6 that the sights are covered by a cylindrical housing 32' corresponding to the housing 32 in Figures 1, 2 and 3. The housings 32' are similarly interiorly coated with black paint or the like. Likewise, the rear sight is painted, or covered, as described above.

It will be seen that it will be feasible with the arrangement shown in Figures 6 and 7 to provide a variable resistance for each of the sight-pieces so as to control the illumination for each. It will be obvious that by connecting the lights in series, the illumination can be controlled together, and by connecting them in parallel with a variable resistance in each circuit, illumination can be controlled separately.

It is to be understood that my invention is not limited to the modification and uses shown and described, but contemplates all such variations as come within the scope and spirit of the appended claims.

I claim:

1. In a sighting device, two spaced apart sighting members of translucent material, the one having an aperture through which the line of sight passes, the other having a tapering end projecting laterally into the line of sight, and a common light source arranged to transmit light from said source through the translucent material of the said sighting members to the internal surface which defines said aperture and the external surface of said tapering end, whereby the said internal and the said external surfaces are luminescent.

2. In a sighting device, two spaced apart sights of translucent material, the one having an aperture through which the line of sight passes, the other having its end extended laterally into the line of sight, and light supplying means arranged to transmit light from said means through the translucent material of the said sights to the internal surface which defines said aperture and the external surface of said laterally extending end, whereby the said internal and the said external surfaces are luminescent.

3. In a sighting device, two spaced apart sights of translucent material, the one having an aperture through which the line of sight passes, the other having its end extended laterally into the line of sight, and light supplying means arranged to transmit light from said means through the translucent material of the said sights to the external surface of said laterally extending end and the internal surface which defines said aperture, said internal surface being coated over with an opaque material except for a circular band of predetermined width which is left uncoated to define a luminescent ring within said aperture.

ARNOLD D. DIRCKSEN.